United States Patent
Fox et al.

(10) Patent No.: US 10,635,104 B2
(45) Date of Patent: Apr. 28, 2020

(54) INTELLIGENT TRANSITIONING BETWEEN AUTONOMOUS AND MANUAL DRIVING MODES OF A VEHICLE

(71) Applicant: INTERNATIONAL BUSINESS MACHINES CORPORATION, Armonk, NY (US)

(72) Inventors: Jeremy R. Fox, Georgetown, TX (US); Gregory J. Boss, Saginaw, MI (US); Andrew R. Jones, Round Rock, TX (US); Christian Compton, Austin, TX (US); John E. Moore, Jr., Pflugerville, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/107,085

(22) Filed: Aug. 21, 2018

(65) Prior Publication Data

US 2020/0064833 A1 Feb. 27, 2020

(51) Int. Cl.
*G05D 1/00* (2006.01)
*B60W 50/08* (2020.01)
*G06K 9/00* (2006.01)

(52) U.S. Cl.
CPC .......... *G05D 1/0061* (2013.01); *B60W 50/082* (2013.01); *G06K 9/00845* (2013.01); *B60W 2540/30* (2013.01)

(58) Field of Classification Search
CPC .............. G05D 1/0061; B60W 50/082; B60W 2540/30; G06K 9/00845
See application file for complete search history.

(56) References Cited

U.S. PATENT DOCUMENTS

| | | | |
|---|---|---|---|
| 9,342,074 B2 | 5/2016 | Dolgov et al. | |
| 9,365,213 B2 | 6/2016 | Stenneth et al. | |
| 9,566,986 B1 | 2/2017 | Gordon et al. | |
| 9,684,306 B2 | 6/2017 | Sprigg | |
| 9,727,056 B2 | 8/2017 | Laur et al. | |
| 9,821,818 B2 | 11/2017 | Cullinane et al. | |
| 2014/0088814 A1 | 3/2014 | You et al. | |
| 2017/0088143 A1* | 3/2017 | Goldman-Shenhar | B60K 35/00 |
| 2018/0326992 A1* | 11/2018 | Aoi | G05D 1/0088 |

(Continued)

OTHER PUBLICATIONS

Kaustubh et al., "The modeling of transfer of steering between automated vehicle and human driver using hybrid control framework," 2016 IEEE Intelligent Vehicles Symposium (IV), Jun. 19-22, 2016 (7 pages).

(Continued)

*Primary Examiner* — Anne Marie Antonucci
(74) *Attorney, Agent, or Firm* — Griffiths & Seaton PLLC (57) ABSTRACT

Embodiments for implementing intelligent transition between autonomous and manual driving modes by a processor. A customized transition plan for one or more entities may be generated for transitioning between an autonomous driving mode and a manual driving mode according to one or more identified contextual factors and driver performance requirements. The customized transition plan may be applied for transitioning between the autonomous driving mode and the manual driving mode.

17 Claims, 6 Drawing Sheets

(56) References Cited

U.S. PATENT DOCUMENTS

2019/0171204 A1* 6/2019 Jang .................... B60W 30/182

OTHER PUBLICATIONS

Nilsson et al., "Safe Transitions From Automated to Manual Driving Using Driver Controllability Estimation," IEEE Transactions on Intelligent Transportation Systems, vol. 16, No. 4, Aug. 2015 (11 pages).

* cited by examiner

INTELLIGENT TRANSITIONING BETWEEN AUTONOMOUS AND MANUAL DRIVING MODES OF A VEHICLE

BACKGROUND OF THE INVENTION

Field of the Invention

The present invention relates in general to computing systems, and more particularly to, various embodiments for implementing intelligent transition between autonomous and manual driving modes of a vehicle by a processor.

Description of the Related Art

Vehicles of every kind, size, and energy consumption are prevalent in every aspect of today's society, as people are more mobile today than likely at any time in recorded history. Autonomous vehicles are quickly growing in popularity and will become the majority of vehicles on the road at some point in the future. Self-driving vehicles (SDVs) are vehicles that are able to autonomously drive themselves through private and/or public spaces. Using a system of sensors that detect the location and/or surroundings of the SDV, logic within or associated with the SDV controls the propulsion, stopping, and steering of the SDV based on the sensor-detected location and surroundings of the SDV.

SUMMARY OF THE INVENTION

Various embodiments for implementing intelligent transition between autonomous and manual driving modes of a vehicle by a processor, are provided. In one embodiment, by way of example only, a method for implementing intelligent transition between autonomous and manual driving modes of a vehicle by a processor is provided. A customized transition plan for one or more entities may be generated for transitioning between an autonomous driving mode and a manual driving mode according to one or more identified contextual factors and driver performance requirements. The customized transition plan may be applied for transitioning between the autonomous driving mode and the manual driving mode.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances or devices may include computers, smartphones, laptops, wearable devices, sensor devices, voice-activated devices, face-activated devices, digital assistants, home appliances, audio systems, televisions, security cameras, security sensors, among countless other examples. Such IoT computing systems may be employed in a variety of settings.

For example, various IoT computing devices may be employed in Self-driving vehicles (SDVs). SDVs are vehicles that are able to autonomously drive themselves through private and/or public spaces. Autonomous vehicles (e.g., SDVs) offer the prospect of eliminating the dangers of erratic driving or accidents. Specifically, the lack of human error while driving may result in a safer journey. Sensors in the autonomous vehicles appear to also allow for vehicles to pack closer together, allowing more on the road, possibly shortening traffic times. Fully autonomous SDVs may even eliminate the need to pass a driving test and/or gain a driving license.

Nonetheless, there remain disadvantages to autonomous vehicles. One challenge is the persistent worry of the computer crashing or malfunctioning, resulting in a major collision. Moreover, as SDVs become more popular, driving may become something that is performed more for pleasure. Certain persons may opt to never drive at all while others may still prefer to drive but desire to responsibly minimize the risk they assume while driving for pleasure. Thus, another challenge of autonomous vehicles is the time period between when an autonomous vehicle is driving and when a human takes control of the vehicle is the most critical and risky part of the driving experience for the operator. This transfer time frame between autonomous driving mode and manual driving mode may be defined as the transition period.

Thus, the mechanisms of the present invention seek to monitor and interact with the user (e.g., operator/driver of a vehicle) during a transition period when the human is taking control or relinquishing control to the autonomous vehicle. In one aspect, the present invention may define and derive a transition plan individually customized for each driver for each particular type of vehicle (e.g., truck, car, van, larger vehicle, smaller vehicle, sport utility vehicle "SUV," etc.) to assist the human in taking control of the vehicle or relinquishing control to the autonomous driving system of an SDV. Thus, the present invention may be employed or activated upon a human desiring to occasionally drive an autonomous vehicle in manual operation mode, but only when able to safely perform the transition from autonomous driving mode to manual operating mode. Thus, one or more contextual factors may be learned and observed that may positively and/or negatively impact transitioning from taking control of the vehicle or relinquishing control to the autonomous driving system of an SDV. In one aspect, one or more contextual factors that may negatively impact transitioning from taking control of the vehicle or relinquishing control to the autonomous driving system of an SDV include, for example: weather events, heavy congestion/traffic, bad road conditions, surrounding risk factors, etc. Thus, the present invention may optimize the transition between the autonomous mode and the fully manual mode according to various contextual factors.

In one aspect, the present invention provides a cognitive system for intelligent transitioning between autonomous and manual driving modes of a vehicle. A customized transition plan for one or more entities may be generated for transitioning between an autonomous driving mode and a manual driving mode according to one or more identified contextual factors and driver performance requirements. The customized transition plan may be applied for transitioning between the autonomous driving mode and the manual driving mode. An appropriate level of compliance with the driver performance requirements by the one or more entities may be determined.

In one aspect, the SDV computing system may include a mobile application such as, for example, "Waze®" (available from Waze Ltd.), that may automatically collect traffic data and road condition information from users as they drive. In one aspect, one or more cameras and sensors may be placed or located at one or more locations of a vehicle (e.g., dashboard, steering wheel, gas pedal, front or rear bumpers, wheel-well, or other locations suitable for mounting or securing a camera). The operator of a vehicle may be made aware of the intelligent transition between autonomous and manual driving modes. Also, the operator of the vehicle may advise a centralized server or "HUB" of a vehicular collaboration system via an interactive GUI or other communication means (e.g., a voice activated detection system of a vehicle in communication with the vehicular collaboration system) of their intent to transition between an autonomous driving mode and a manual driving mode.

It should be noted that as used herein, "vehicle" may include one or more variety types of modes of transportation. For example, a vehicle may include automobiles (e.g., car, sport utility vehicle "SUV", trucks, etc.), off-road vehicles (e.g., all-terrain vehicles "ATV") bicycles, motorcycles, trains, subways, ships, boat, aircrafts, watercrafts, sail crafts, hovercrafts, golf carts, and/or other types of transportation or movable objects. In an additional aspect, a vehicle may include one or more types of transportation or movable objects that require a license and/or registration (e.g., a driver's license issued by a governmental or regulatory agency) in order to operate and move about a roadway, highway, railways, waterways, and/or other means for operating the one or more types of transportation or movable objects.

The so-called "appropriateness" of an appropriate level of compliance with the driver performance requirements may be subjective and context dependent. For example, one solution for driver performance requirements may be interpreted and evaluated to be either satisfactory or unsatisfactory depending on the tone, sentiment, and/or feeling in the text data and/or also depending on a user profile of each user. Accordingly, the so-called "appropriateness" of performance requirements may depend greatly upon contextual factors, such as a, user profile, environmental factors, status of a recipient, weather data, ability to perform a task, and other contextual factors. A deeper, cognitive analysis of the user may be provided to further understand the user and/or interpret the appropriateness of a given context.

It should be noted as described herein, the term "cognitive" (or "cognition") may be relating to, being, or involving conscious intellectual activity such as, for example, thinking, reasoning, or remembering, that may be performed using a machine learning. In an additional aspect, cognitive or "cognition may be the mental process of knowing, including aspects such as awareness, perception, reasoning and judgment. A machine learning system may use artificial reasoning to interpret data from one or more data sources (e.g., sensor based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor based devices or other computing systems that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
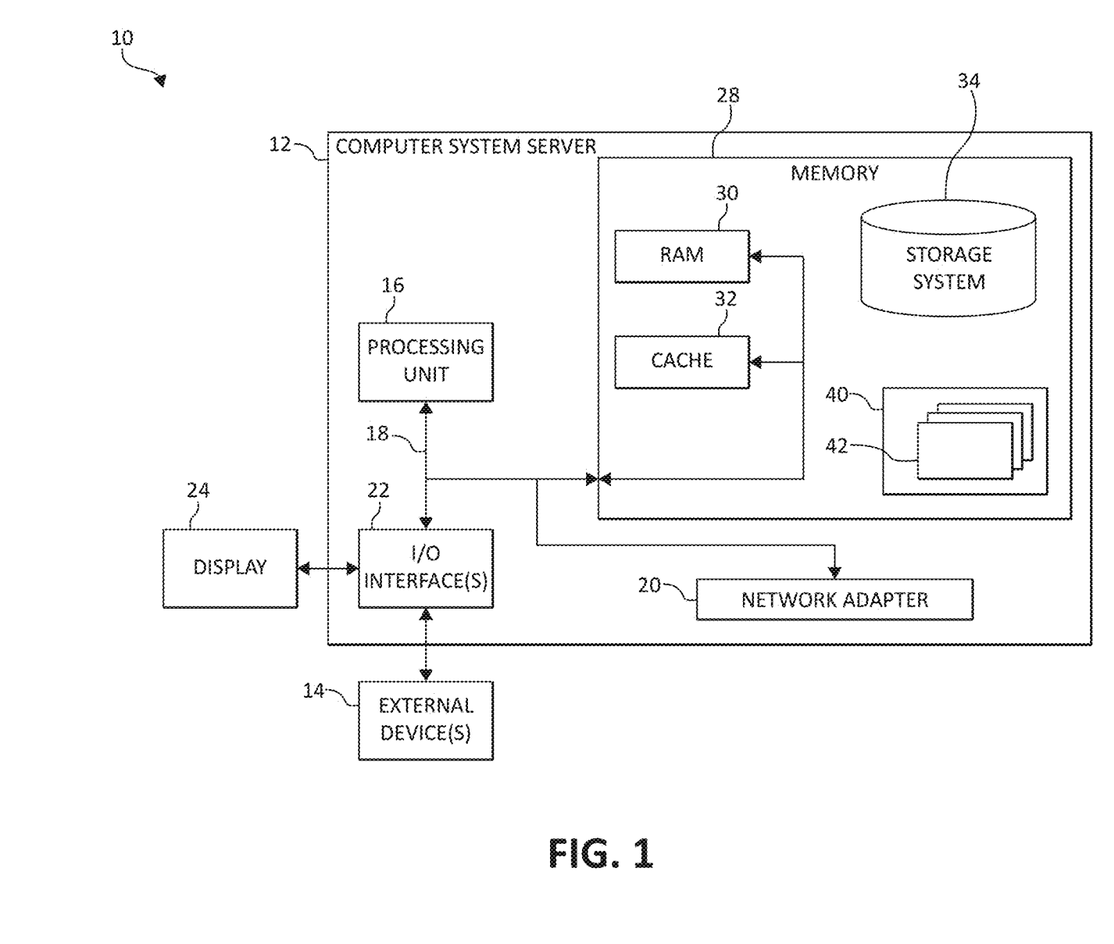
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. Network adapter may communicate with a hub server or a cloud via wireless, optical fibre, or copper fibre. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
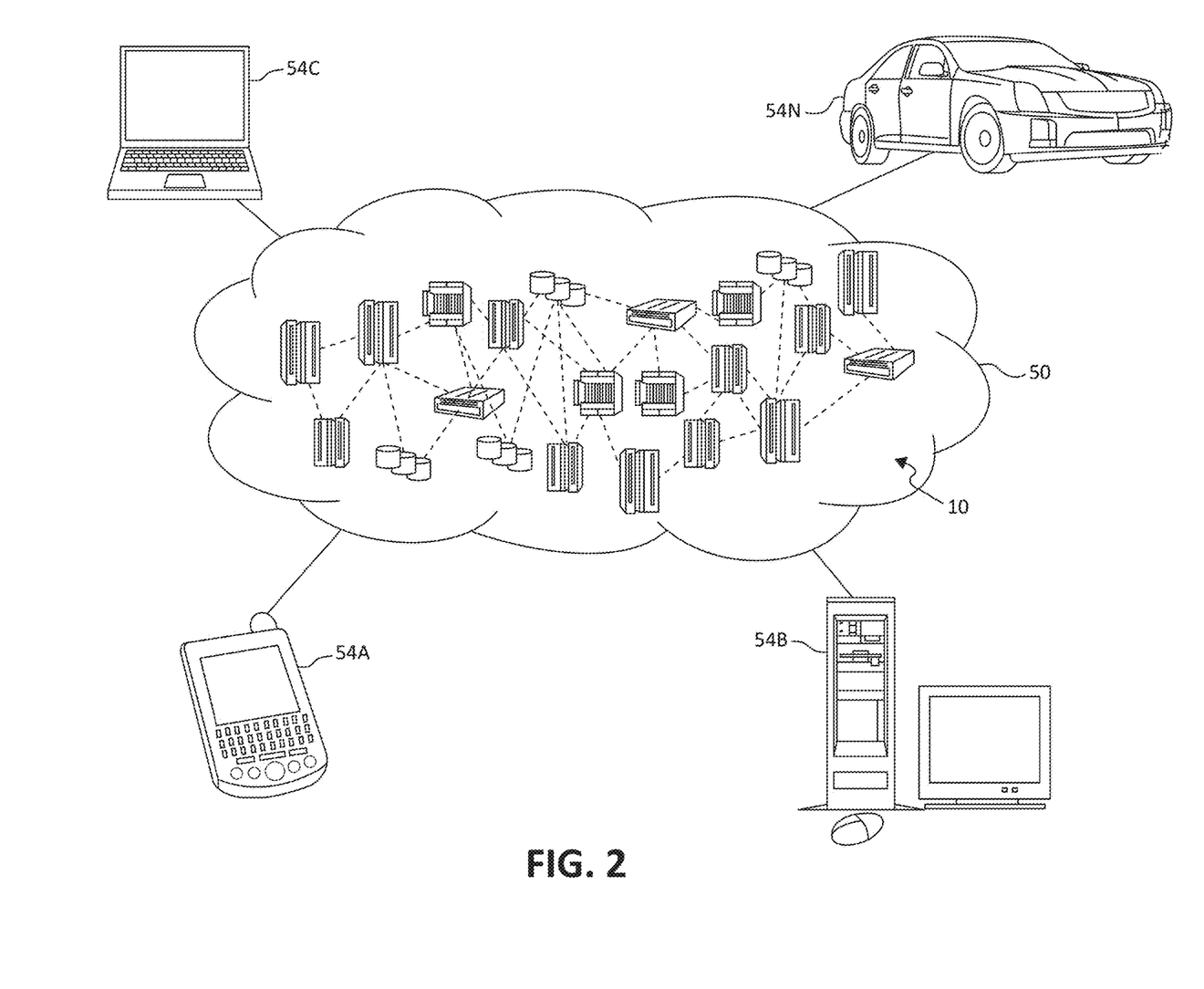
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser provided by a service provider).

Figure 3:
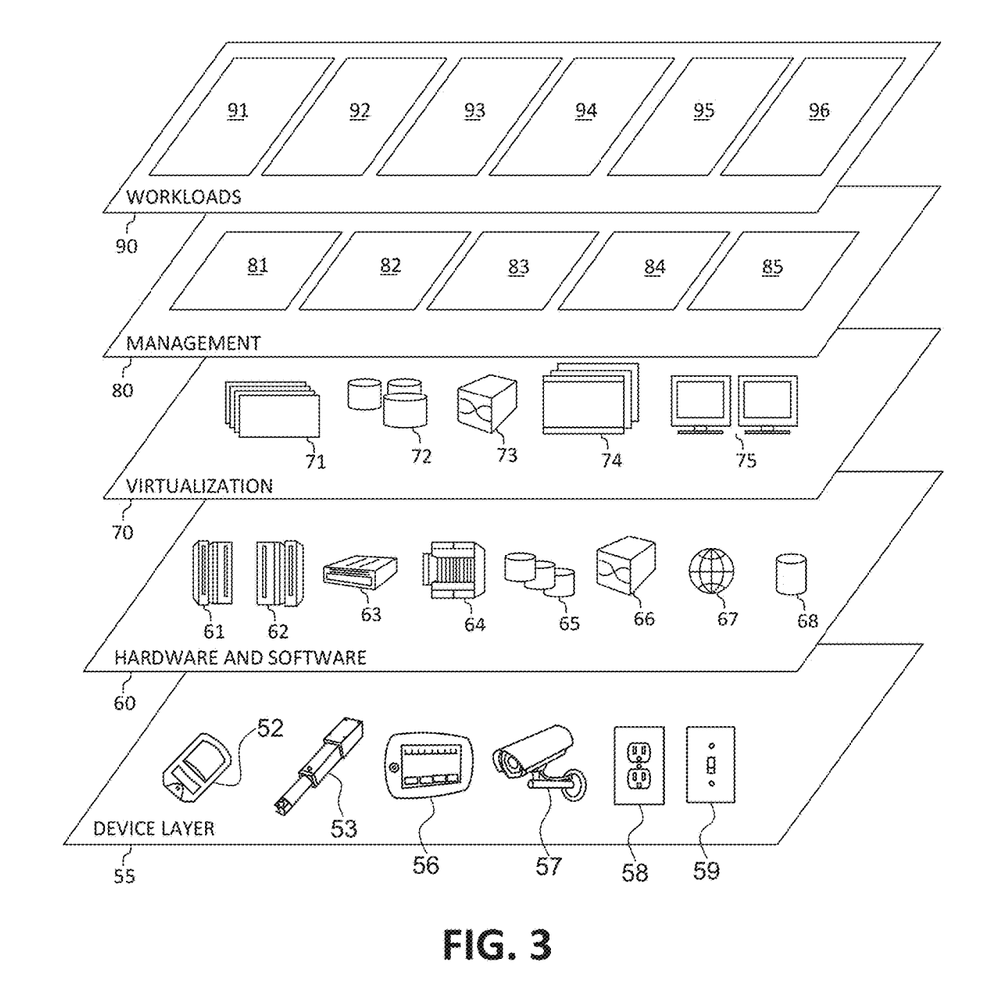
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "Internet of Things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture, such as PowerPC, based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent transition between autonomous and manual driving modes of a vehicle. In addition, workloads and functions 96 for intelligent transition between autonomous and manual driving modes of a vehicle may include such operations as data analysis (including data collection and processing from various environmental sensors), collaborative data analysis, and predictive data analytics functions. One of ordinary skill in the art will appreciate that the intelligent transition between autonomous and manual driving mode workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
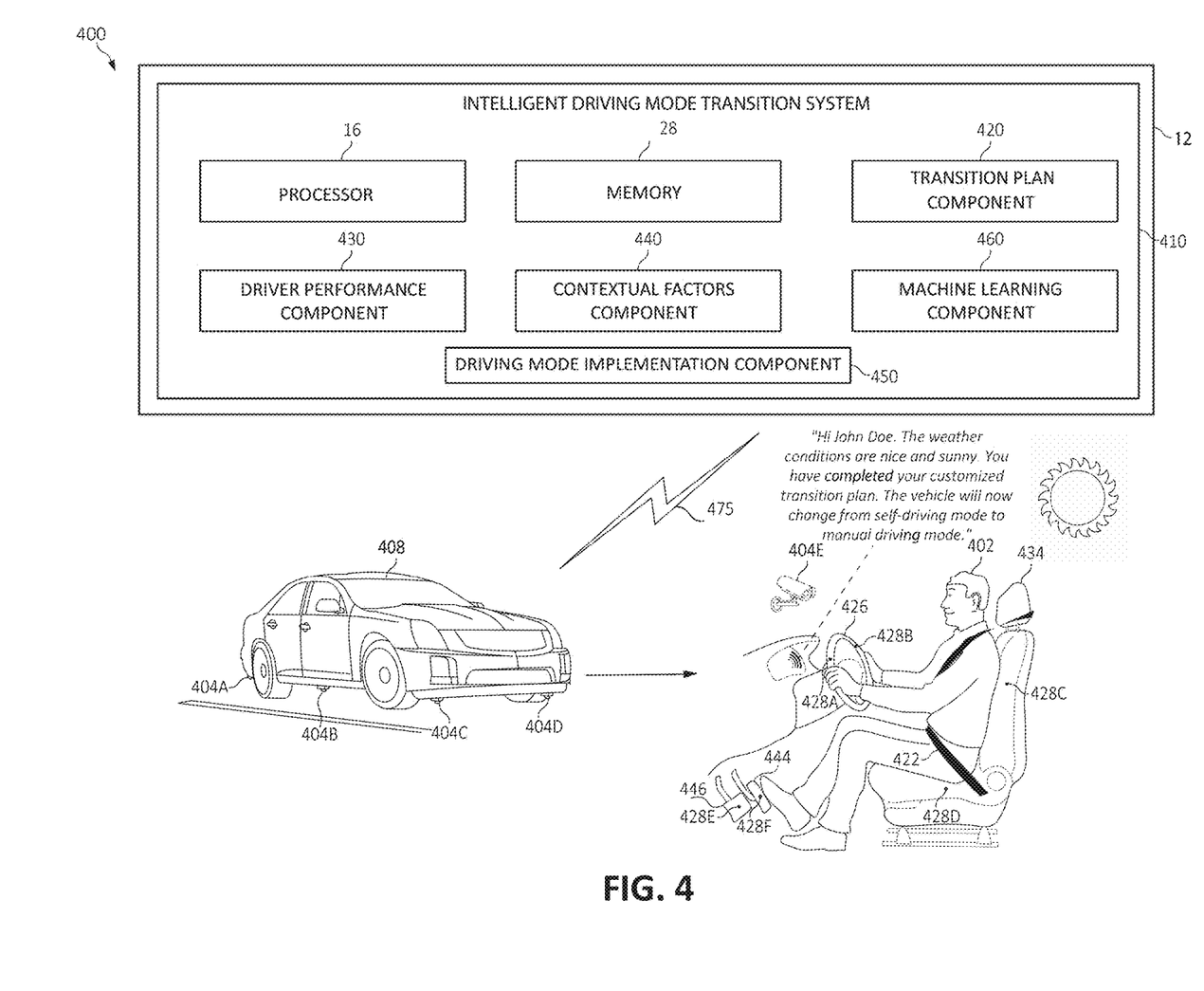
FIG. 4 is an additional block diagram depicting an exemplary functional relationship between various aspects of the present invention.

Turning to FIG. 4, a block diagram of various hardware 400 equipped with various functionality as will be further described is shown in which aspects of the mechanisms of the illustrated embodiments may be realized. In one aspect, one or more of the components, modules, services, applications, and/or functions described in FIGS. 1-3 may be used in FIG. 4.

Figure 5:
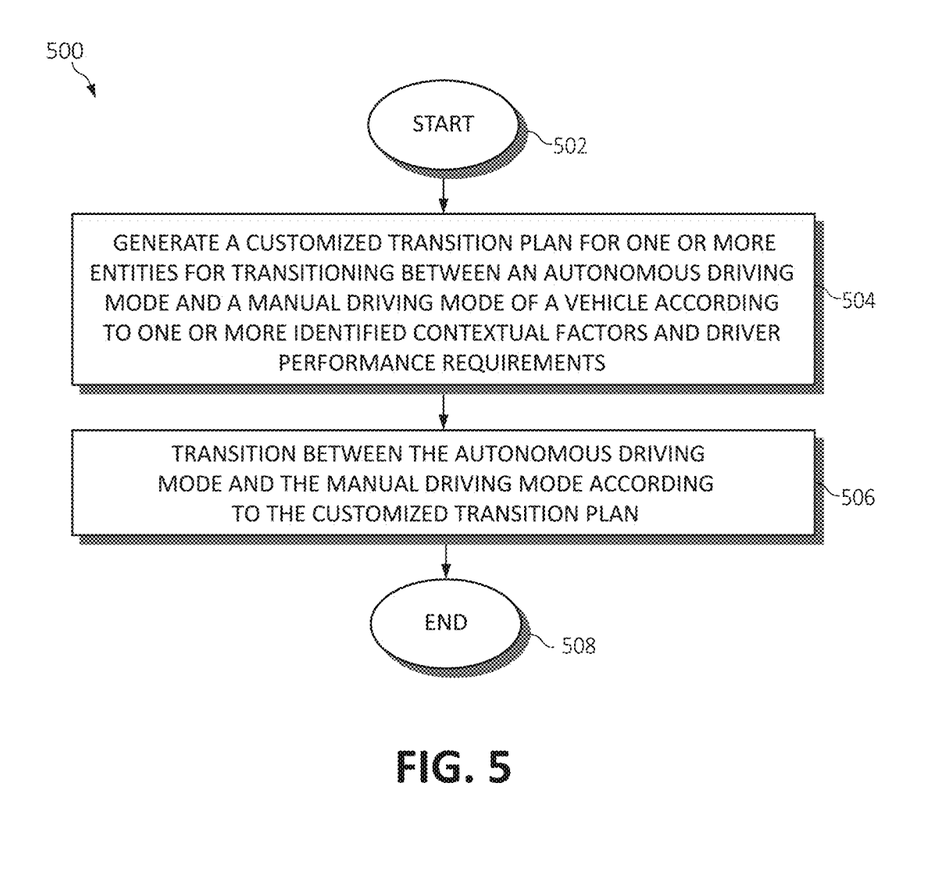
FIG. 5 is a flowchart diagram of an exemplary method for implementing intelligent transition between autonomous and manual driving modes of a vehicle by a processor, in which various aspects of the present invention may be realized.

For example, computer system/server 12 of FIG. 1 may be included in FIG. 5 and may be connected to other computing nodes (such as computer systems of vehicles) over a distributed computing network, where additional data collection, processing, analytics, and other functionality may be realized. The computer system/server 12 of FIG. 1, may include an intelligent driving mode transition system 410. In one embodiment, the intelligent driving mode transition system 410 may be in communication via network or communication link 475 with one or more vehicles such as, for example, vehicle 408.

In one aspect, the intelligent driving mode transition system 410 may be an independent computing service provided by one or more computing systems and servers (e.g., a "HUB") for illustrative convenience but may be included in one or more components, modules, services, applications, and/or functions of FIGS. 1-3) and external to the vehicles 408. In an additional embodiment, the intelligent driving mode transition system 410 may be located and installed within one or more vehicles such as, for example, vehicle 408. Vehicle 408 may be associated with the intelligent driving mode transition system 410 via one or more pre-authorization operations and/or may be instantaneously joined to the intelligent driving mode transition system 410 via a series of authentication operations to join and grant permission to the intelligent driving mode transition system 410 to gain access to one or more IoT devices and/or computing systems of vehicles 408 for sharing the collaborative data.

Vehicle 408 may be driven by an occupant and/or by using self-driving technology (e.g., autopilot). Vehicle 408 may have installed thereon one or more internet of things (IoT) devices, such as cameras 404A-E and sensor based devices 428A-F to gather data in relation to each of the occupants of the vehicle 408. That is, a variety of IoT devices, such as cameras 404A-E (including UV/thermal cameras and the like capable of capturing a field of view "FOV" outside, inside and around each occupant of a vehicle) and sensor devices 428A-F (e.g., audio input devices, recording devices, additional cameras, temperature sensors, atmospheric sensors, biological sensors, steering wheel sensor, gas pedal/brake sensors or other sensor devices to record or broadcast a wide variety of data) may be installed in and/or around the vehicle 408. For example, sensors 428A-B may be installed on steering wheel 426, sensors 428C-D may be installed on seat 434, and sensors 428E-F may be installed on gas pedal 444 and brake 446, each of which may be included in vehicle 408. In an additional aspect, the cameras 404A-E and sensor based devices 428A-F may be used collectively and/or individually to record, track, and/or monitor a position of a vehicle in three-dimensional space.

For example, one or more the cameras 404A-E may capture images of each occupant of the vehicle 408 such as, for example, body position, extremity positions (e.g., hands) in relation to a control mechanism of the driver (e.g., hands on a steering wheel and/or gear shift, etc.). Vehicle 408 may also receive data from one or more external sources and/or IoT devices (e.g., cellular telephone 54A, desktop computer 54B, laptop computer 54C, and/or automobile computer system 54N of FIG. 2 or other IoT devices such as a smart watch).

It should be noted that vehicle 408 may be an automobile, off-road vehicle, bicycle, motorcycle, train, subway, ship, boat, aircraft, watercraft, sail craft, hovercraft, golf cart, and/or other type of transportation or movable object.

Also, the intelligent driving mode transition system 410 may incorporate processing unit 16 ("processor") and memory 28 of FIG. 1, for example, to perform various computational, data processing and other functionality in accordance with various aspects of the present invention. The intelligent driving mode transition system 410 may also include a transition plan component 420, driver performance component 430, contextual factors component 440, and a driving mode implementation component 450, each of which may be controlled and in communication with processing unit 16 and memory 28.

Using the data collected from vehicle 408, the transition plan component 420 may cognitively generate a customized transition plan for user 402 (e.g., the driver of vehicle 408) for transitioning between an autonomous driving mode and a manual driving mode of a vehicle according to one or more identified contextual factors and driver performance requirements. The transition plan component 420 may determine a level of compliance with the driver performance requirements by the one or more entities.

The transition plan component 420 may also determine an appropriate transition time required for each of the one or more entities for one or more types of vehicles to complete the customized transition plan. For example, an experienced driver may require less time for completing a customized transition plan for a particular vehicle as compared to less experienced drivers. Thus, using one or more IoT devices or computing systems, the vehicle 408 may broadcast, communicate, and/or alert/notify a driver in relation to the actions of the driver compared to the required actions of the customized transition plan.

In association with the transition plan component 420, the driving mode implementation component 450 may enable vehicle 408 to transition between the autonomous driving mode and the manual driving mode according to the customized transition plan. For example, the vehicle 408, using one or more communication mechanisms of the vehicle 408, may audibly state "Hi John Doe. The weather conditions are nice and sunny. You have completed your customized transition plan. The vehicle will now change from self-driving mode to manual driving mode."

It should be noted that the transition plan component 420 may use the various IoT devices and/or historical data/user profile and also engage in an interactive dialog using one or more communication systems of the vehicle 408 to identify and learn the identity and characteristics of each occupant and/or driver. If an occupant is previously unknown, the transition plan component 420 may capture a variety of data (e.g., via sensors, cameras, or other IoT devices/communication systems associated with the vehicle) to identity and learn a user profile/driver characteristics. For example, the transition plan component 420 may use facial recognition and/or audio data to identify the driver is an adult male being around 45 years of age. Also, the transition plan component 420 may dynamically and continuously perform the identification and authentication operation. For example, if during the autonomous driving mode, the original, identified and authenticated driver (e.g., a legal and licensed adult driver) changes seats with another occupant whereby the new driver sitting in the driver's seat is identified as an underaged and unlicensed driver, the transition plan component 420 may prohibit the ability to transfer vehicle control from the autonomous driving mode to the manual driving mode.

The driver performance component 430 may define the driver performance requirements to include requirements for location of one or more extremities of the one or more entities in relation to a control mechanism of a vehicle, pedal stability, bodily position of the one or more entities, eye positions, gaze control of the one or more entities, biometric verification, or a combination thereof. Thus, the driver performance component 430 may provide instructions for completing the driver performance requirements. The driver performance component 430 may learn, identify, and/or collect the actions performed by user 402 to analyze, evaluate, and determine a level of compliance of the driver performance requirements.

The contextual factors component 440 may define the one or more identified contextual factors to include weather conditions, road conditions, autonomous vehicle manufacturer conditions, a level of traffic congestion within a selected distance from the vehicle, or other user defined contextual factors. The contextual factors component 440 may learn, identify, collect, analyze, evaluate, and/or determine each of the contextual factors positively and/or negatively affecting the user 402.

The machine learning component 460 may learn and build one or more models for intelligently learning and generating a transition plan for user 402 and to also learn the one or more identified contextual factors, the driver performance requirements, and the customized transition plan for the one or more entities, and minimum and maximum transition times required for each of the one or more entities to complete the customized transition plan.

In one aspect, the machine learning component 460, as described herein, may be performed by a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

With the foregoing functional components 400 in view, consider some of the various aspects of the illustrated embodiments such as, for example Option 1 and Option 2. In one aspect, option 1 may provide for individualizing a transition plan for a given driver between autonomous and manual driving mode. The intelligent driving mode transition system 410 may measure driver and environment attributes and create a transition plan. Since each driver may have different skills and levels of experience for each type of vehicle and be in unique environments, the transition plan may be customized to individual drivers. Moreover, even the same driver may have varying, and different transition plans each time the driver desires or expresses an intent to transition between an autonomous driving mode and a manual driving mode of a vehicle. In one aspect, as used herein, the transition plan may also be referred to as "transition requirements" and implemented such that the "transition requirements" may be mandatory for compliance.

In one aspect, a sample transition plan provided by the intelligent driving mode transition system 410 may consist of the following elements.

1) Hand Position Requirements:

The intelligent driving mode transition system 410 may require that one or more both hands of the driver be located on the steering wheel and engaged through steering wheel sensing technology. For example, the driver may need to have hands in a selected position (e.g., "10 and 2" hand-steering wheel position) and appropriately grasp the wheel for a set period of time (e.g., 10-15 seconds), prior to the vehicle transferring the element of steering control from the autonomous vehicle over to the human driver in manual driving mode.

2) Pedal Stability Requirements:

The intelligent driving mode transition system 410 may require that a pedal (e.g., accelerator) remain within a safe operating range (e.g., an amount of pressure on the pedal being stable causing the speed of the vehicle to remain constant) without the driving over applying pressure to the accelerator or brake pedal abruptly. A transition can take effect over a number of seconds as the intelligent driving mode transition system 410 slowly transfers pedal control over to the human while still maintaining continuity. For example, if the vehicle is on cruise control the driver may be required to apply pressure on the gas pedal sufficient enough to maintain the same cruising speed as detected by one or more sensors and/or speed/acceleration measuring operations.

3) Driver Position Requirements:

The intelligent driving mode transition system 410 may track a human's movement from inside the vehicle via camera or seat sensor and requiring the driver to be sitting in the driver's seat in and/or in a defined posture.

4) Eye Position Requirements:

The intelligent driving mode transition system 410 may identify and determine the eye position and ensure that the human driver is looking in the direction of the road for a selected period of time (e.g., 30 seconds are more)

5) Gaze Control Requirements:

The intelligent driving mode transition system 410 may require a quantifiable measurement of human focusing on driving the vehicle by detecting if the human driver taking over control of the vehicle is distracted by other events inside or outside the vehicle. The intelligent driving mode transition system 410 may can define a gaze threshold and prohibit the human from acquiring manual control of the vehicle until the measured time of gazing in a defined direction is equal to or greater than gazing threshold.

6) Contextual/Environmental Measurements:

A) Traffic Congestion/Vehicle Density: The intelligent driving mode transition system 410 may measure the vehicle density in near vicinity (e.g., traffic congestion). If there is a high density of nearby vehicles (e.g., external cameras capturing a defined number of vehicles within a defined distance and/or traffic congestion determined from one or more external sources) the intelligent driving mode transition system 410 may increase the transition time such that the time to complete the one or more of the required instructions be increased by a defined amount of time.

B) Road conditions: Based on current road conditions, the intelligent driving mode transition system 410 may require increased time, attention, and/or stability by the driving for performing one or more control operations of the vehicle (e.g., turning, speed, braking, etc.) depending on the external conditions (e.g., wet roads, ice, snow, fog/low visibility).

C) Autonomous Vehicle Manufacturer: The intelligent driving mode transition system 410 may require one or more operations/conditions be performed or considered as required by manufacturer specific conditions that relate to the environment (e.g., the transition plan may be adjust upon determining snow is falling and the roads are wet thereby requiring the vehicle to be in 4-wheel drive as compared to 2-wheel drive).

In one aspect, option 2 may include modifying a transition time of a customized transition plan based on driver performance measurements. For example, a driver transition time and performance measurement operations may include the following steps.

In step 1), a transition time history may be determined and assessed based on previous experiences and an average "safe transition time" for each driver may be determined. That is, the intelligent driving mode transition system 410 may define an average baseline safe transition time for each user.

In step 2), the intelligent driving mode transition system 410 may learn, apply, and identify a personal transition time unique to each driver and/or type of vehicle. The transition times may be applied to each driver, specific to each vehicle and will vary from human to human, and driver to vehicle for each specific human driver. Thus, different drivers may have different values in different types of vehicles whereby the baseline values need to be vehicle and driver specific. Thus, a baseline safe transition time may be determined for each specific user according to each specific type of vehicle. For example, an experienced driver of a smaller vehicle (e.g., a car) may have one baseline safe transition time for a smaller vehicle while the same driver may be less experienced driving a larger vehicle (e.g., a truck or van) and have a different baseline safe transition time for the larger vehicle.

In step 3), the intelligent driving mode transition system 410 may learn, identify, and apply one or more extenuating circumstances for a customize transition plan. In one aspect, the intelligent driving mode transition system 410 may identify drivers in sub-optimal driving conditions such as, for example, unsafe, hazardous, illegal, and/or dangerous driving conditions (e.g., illness, crying, overly emotional, under age, etc.). It should be noted that the intelligent driving mode transition system 410 may authenticate each driver according to a learned or detected user profile, collected biometric data (e.g., fingerprints, retina scanner, facial recognition, heart monitor, etc.), and/or collected/analyzed audio/video recognition data. For example, the intelligent driving mode transition system 410 may recognize, via facial recognition, the detected driver is an underage driver according to local jurisdictional laws/rules whereby the intelligent driving mode transition system 410 may prohibit transferring to the driver manual control of the vehicle.

In step 4) one or more concentration levels can be quantified which may be utilized to quantify concentration levels of the driver.

Thus, the present invention provides for intelligent transition between autonomous and manual driving modes according to both real-time determined/measured environmental and driver characteristics and historical driver transitioning performance while maximizing/optimizing the safety of operating the vehicle either in the autonomous driving mode, the manual driving mode, and/or during the transition between each of the autonomous and manual driving modes (e.g., transitioning from the autonomous driving mode to the manual driving mode or transitioning from the manual driving mode to the autonomous driving mode).

Turning now to FIG. 5, a method 500 for implementing intelligent transition between autonomous and manual driving modes by a processor is depicted, in which various aspects of the illustrated embodiments may be implemented. The functionality 500 may be implemented as a method executed as instructions on a machine, where the instructions are included on at least one computer readable medium or one non-transitory machine-readable storage medium. The functionality 500 may start in block 502.

A customized transition plan for one or more entities may be generated for transitioning between an autonomous driving mode and a manual driving mode according to one or more identified contextual factors and driver performance requirements, as in block 504. The customized transition plan may be applied for transitioning between the autonomous driving mode and the manual driving mode, as in block 506. The functionality 500 may end, as in block 508.

Figure 6:
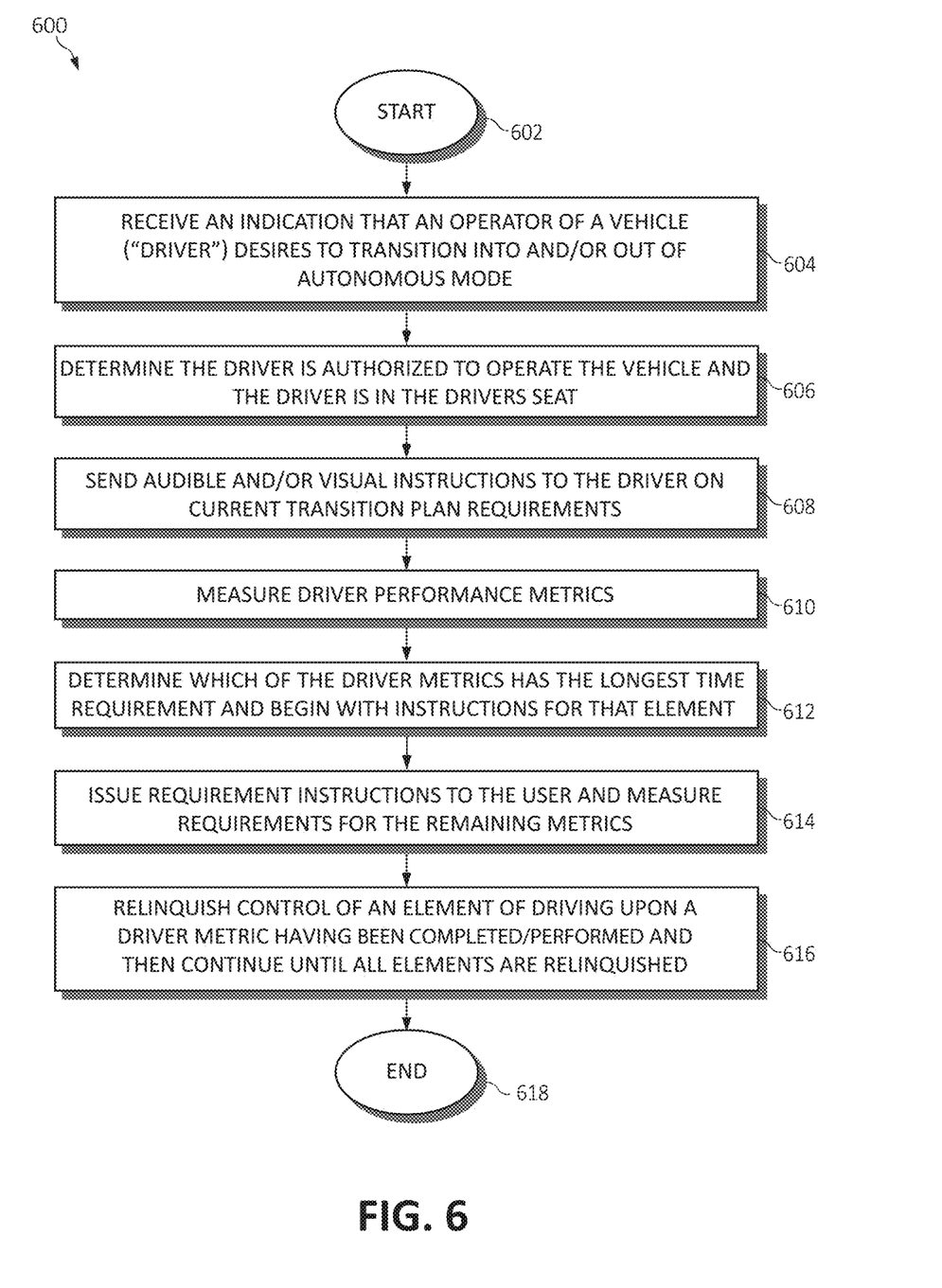
FIG. 6 is a flowchart diagram of an additional exemplary method for implementing intelligent transition between autonomous and manual driving modes of a vehicle by a processor, in which various aspects of the present invention may be realized.

Turning now to FIG. 6, a method 600 for implementing intelligent transition between autonomous and manual driving modes by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. The functionality 600 may start in block 602.

An indication may be received from an operator of a vehicle ("drive") indicating a desire (e.g., intent) to transition into and/or out of an autonomous driving mode (e.g., self-driving "autopilot" system), as in block 604. An operation is executed that determines the driver authorized to operate the vehicle and the driver is in the driver's seat, as in block 606. One or more instructions (e.g., audible and/or visual instructions) may be provided/sent to the driver on current transition plan requirements, as in block 608. One or more driver performance metrics may be measured, as in block 610. An operation may be executed that determines which of the driver metrics has the longest time requirement (e.g., longest time to perform) and begin with instructions for that element (e.g., driving metric), as in block 612. Requirement instructions may be issued to the user and requirements for the remaining metrics may be measured, as in block 614. An operation may be performed to relinquish control of an element of driving upon a driver metric having been completed/performed (e.g., steering control of the vehicle transferred to the driver upon compliance with a requirement of two hands being placed on the wheel at a defined location) and then continue until all elements are relinquished, as in block 616. The functionality 600 may end, as in block 618.

In one aspect, in conjunction with and/or as part of at least one block of FIGS. 5-6, the operations of methods 500 and/or 600 may include each of the following. The operations of methods 500 and/or 600 may determine a level of compliance with the driver performance requirements by the one or more entities.

The operations of methods 500 and/or 600 may define the driver performance requirements to include requirements for location of one or more extremities of the one or more entities in relation to a control mechanism of a vehicle, pedal stability, bodily position of the one or more entities, eye positions, gaze control of the one or more entities, biometric verification, or a combination thereof, define the one or more identified contextual factors to include a level of traffic congestion within a selected distance from the vehicle, weather conditions, road conditions, autonomous vehicle manufacturer conditions, and/or determine an appropriate transition time required for each of the one or more entities for one or more types of vehicles to complete the customized transition plan.

The operations of methods 500 and/or 600 may initiate a machine learning mechanism to learn the one or more identified contextual factors, the driver performance requirements, and the customized transition plan for the one or more entities, and minimum and maximum transition times required for each of the one or more entities to complete the customized transition plan.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for implementing intelligent transition between autonomous and manual driving modes, comprising:

generating a customized transition plan for one or more entities for transitioning between an autonomous driving mode and a manual driving mode of a vehicle according to one or more identified contextual factors and driver performance requirements; and causing the transition between the autonomous driving mode and the manual driving mode according to the customized transition plan; wherein the driver performance requirements include authenticating an identified operator of the vehicle prior to causing the transition such that, when the identified operator of the vehicle cannot be authenticated, the transition between the autonomous driving mode and the manual driving mode is prohibited.

2. The method of claim 1, further including determining a level of compliance with the driver performance requirements by the one or more entities.

3. The method of claim 1, further including defining the driver performance requirements to include requirements for location of one or more extremities of the one or more entities in relation to a control mechanism of the vehicle, pedal stability, bodily position of the one or more entities, eye positions, gaze control of the one or more entities, biometric verification, or a combination thereof.

4. The method of claim 1, further including defining the one or more identified contextual factors to include a level of traffic congestion within a selected distance from the vehicle, weather conditions, road conditions, and autonomous vehicle manufacturer conditions.

5. The method of claim 1, further including defining an appropriate transition time required for each of the one or more entities for one or more types of vehicles to complete the customized transition plan.

6. The method of claim 1, further including implementing a machine learning mechanism to learn the one or more identified contextual factors, the driver performance requirements, and the customized transition plan for the one or more entities, and minimum and maximum transition times required for each of the one or more entities to complete the customized transition plan.

7. A system for implementing intelligent transition between autonomous and manual driving modes, comprising:

one or more computers with executable instructions that when executed cause the system to:
generate a customized transition plan for one or more entities for transitioning between an autonomous driving mode and a manual driving mode of a vehicle according to one or more identified contextual factors and driver performance requirements; and
cause the transition between the autonomous driving mode and the manual driving mode according to the customized transition plan; wherein the driver performance requirements include authenticating an identified operator of the vehicle prior to causing the transition such that, when the identified operator of the vehicle cannot be authenticated, the transition between the autonomous driving mode and the manual driving mode is prohibited.

8. The system of claim 7, wherein the executable instructions further determine a level of compliance with the driver performance requirements by the one or more entities.

9. The system of claim 7, wherein the executable instructions further define the driver performance requirements to include requirements for location of one or more extremities of the one or more entities in relation to a control mechanism of the vehicle, pedal stability, bodily position of the one or more entities, eye positions, gaze control of the one or more entities, biometric verification, or a combination thereof.

10. The system of claim 7, wherein the executable instructions further define the one or more identified contextual factors to include a level of traffic congestion within a selected distance from the vehicle, weather conditions, road conditions, and autonomous vehicle manufacturer conditions.

11. The system of claim 7, wherein the executable instructions further determine an appropriate transition time required for each of the one or more entities for one or more types of vehicles to complete the customized transition plan.

12. The system of claim 7, wherein the executable instructions further implement a machine learning mechanism to learn the one or more identified contextual factors, the driver performance requirements, and the customized transition plan for the one or more entities, and minimum and maximum transition times required for each of the one or more entities to complete the customized transition plan.

13. A computer program product for implementing intelligent transition between autonomous and manual driving modes by a processor, the computer program product comprising a non-transitory computer-readable storage medium having computer-readable program code portions stored therein, the computer-readable program code portions comprising:

an executable portion that generates a customized transition plan for one or more entities for transitioning between an autonomous driving mode and a manual driving mode of a vehicle according to one or more identified contextual factors and driver performance requirements; and an executable portion that causes the transition between the autonomous driving mode and the manual driving mode according to the customized transition plan; wherein the driver performance requirements include authenticating an identified operator of the vehicle prior to causing the transition such that, when the identified operator of the vehicle cannot be authenticated, the transition between the autonomous driving mode and the manual driving mode is prohibited.

14. The computer program product of claim 13, further including an executable portion that determines a level of compliance with the driver performance requirements by the one or more entities.

15. The computer program product of claim 13, further including an executable portion that:
defines the driver performance requirements to include requirements for location of one or more extremities of the one or more entities in relation to a control mechanism of the vehicle, pedal stability, bodily position of the one or more entities, eye positions, gaze control of the one or more entities, biometric verification, or a combination thereof; and
define the one or more identified contextual factors to include a level of traffic congestion within a selected distance from the vehicle, weather conditions, road conditions, and autonomous vehicle manufacturer conditions.

16. The computer program product of claim 13, further including an executable portion that determines an appropriate transition time required for each of the one or more entities for one or more types of vehicles to complete the customized transition plan.

17. The computer program product of claim 13, further including an executable portion that implements a machine learning mechanism to learn the one or more identified contextual factors, the driver performance requirements, and the customized transition plan for the one or more entities, and minimum and maximum transition times required for each of the one or more entities to complete the customized transition plan.

* * * * *